(No Model.)  2 Sheets—Sheet 1.

J. RIGBY.
METHOD OF CONSTRUCTING CAR WHEELS.

No. 409,708.  Patented Aug. 27, 1889.

Witnesses
Will T. Norton
W. A. Roberts

Inventor
James Rigby
By his Attorney
E. B. Clark (No Model.) 2 Sheets—Sheet 2.

J. RIGBY.
METHOD OF CONSTRUCTING CAR WHEELS.

No. 409,708. Patented Aug. 27, 1889.

Witnesses  
Will T. Norton  
H. A. Roberts

Inventor  
James Rigby  
By his Attorney  
E. B. Clark

UNITED STATES PATENT OFFICE.

JAMES RIGBY, OF MINNEAPOLIS, MINNESOTA.

METHOD OF CONSTRUCTING CAR-WHEELS.

SPECIFICATION forming part of Letters Patent No. 409,708, dated August 27, 1889.

Application filed January 23, 1889. Serial No. 297,242. (No model.)

*To all whom it may concern:*

Be it known that I, JAMES RIGBY, a citizen of the United States, residing at Minneapolis, in the county of Hennepin and State of Minnesota, have invented certain new and useful Improvements in Methods of Constructing Car-Wheels; and I do hereby declare the following to be a full, clear, and exact description of the invention, such as will enable others skilled in the art to which it appertains to make and use the same.

This invention relates to an improved method of constructing car-wheels, and particularly to the method of interlocking the tire and body and securing them rigidly together by simple means which are made integral with such tire and body, as hereinafter described.

The object of the invention is to provide for constructing car-wheels having a body and tire and securing such parts together without nuts and bolts or rivets or detachable spring locking-rings, heretofore proposed.

The outer periphery of the body and inner periphery of the tire are formed with certain annular grooves, beads, and flanges corresponding one to the other, so as to interlock when fitted together, and a flange is formed on the tire, which is heated and hammered down over the body after the parts are fitted together, so that they are rigidly held in place and cannot work apart or become loose in ordinary wear.

The method of constructing my improved wheel will now be fully described with reference to the accompanying drawings, in which—

Figure 1:
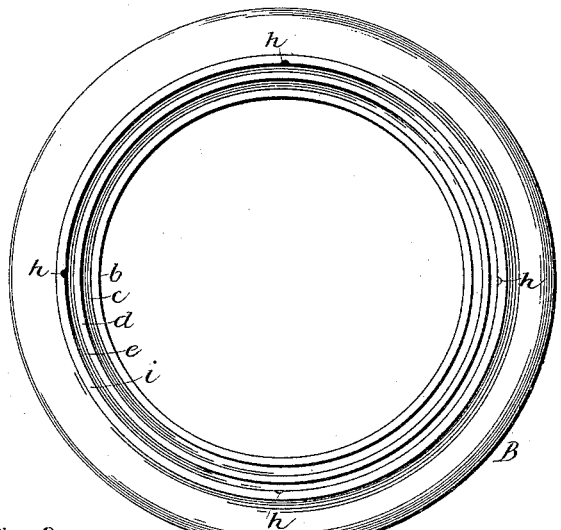
Figure 2:
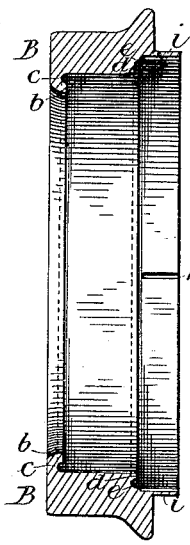
Figure 3:
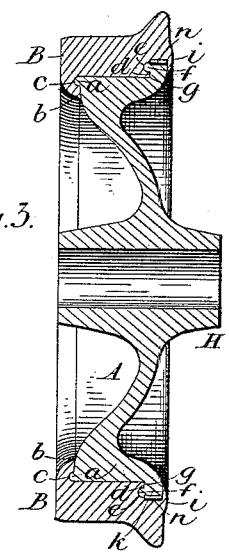
Figure 4:
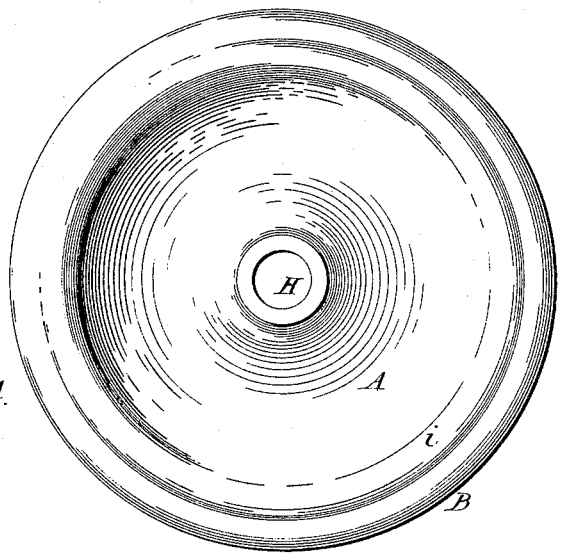
Figure 5:
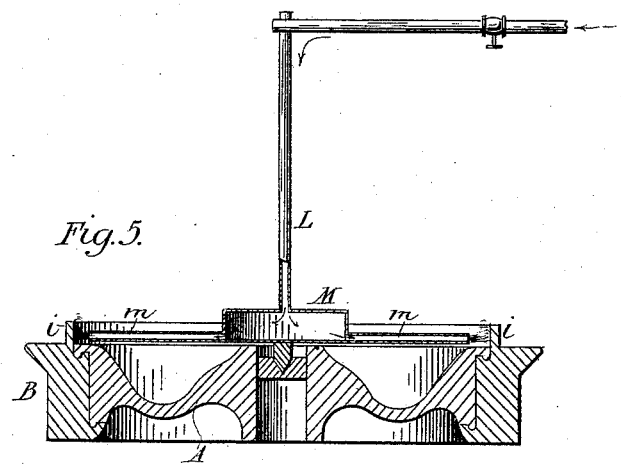
Figure 6:
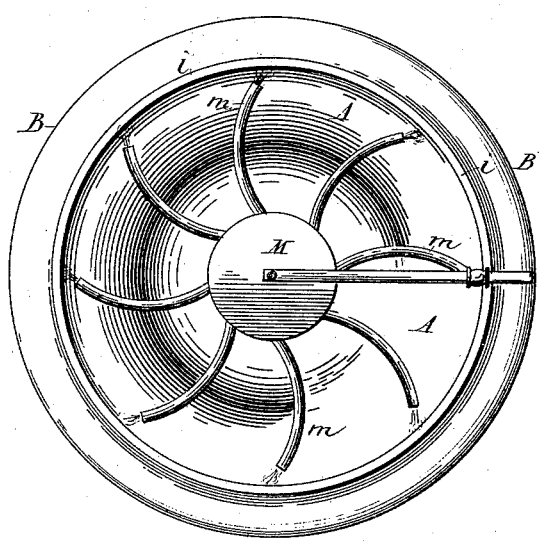

Figure 1 represents the inner face view of the tire, looking down into the annular grooves formed in the ledges. Fig. 2 represents a vertical diametrical section of the tire. Fig. 3 represents a vertical diametrical section of the body and tire fitted together. Fig. 4 represents an inside face view of the completed wheel. Fig. 5 represents a transverse diametrical section of the wheel and a gas-heating device. Fig. 6 represents a top plan thereof.

The body A of the wheel is formed of cast-iron, wrought-iron, or steel or other suitable metal or alloy, and is provided with a large flange $k$, extending in the direction of the radii from its periphery and at its inner face, and with an annular bead $a$, raised upon its outer face just at the junction of the face and periphery. The body has also the usual hub and axle-opening H. After the body is formed in the rough it is preferably placed in a lathe and turned, where by means of a suitable tool there is cut on the inside of flange $k$ the annular groove $g$ and bead $f$. The bead $a$ may be cut at the same time and by the same tool into smooth regular form, though it is my purpose to cast or otherwise raise the bead $a$ in the rough condition upon the body before it is put into the lathe.

The tire B is rolled into the proper shape and size in the usual manner, and has formed on its inner periphery the steps or ledges shown in Figs. 1 and 2 and the flange $i$, extending from its inner face nearly parallel with the tread of the tire. A flange $b$ projects inward from the inner periphery of the tire at its outer face, and forms the inner step or ledge seen in Fig. 1. The outer step or ledge is formed near the inner face of the tire, and flange $i$ projects horizontally outward from such inner face inside of the usual peripheral flange projecting from the tread of the wheel. The tire having been made in the rough condition, it is turned in a lathe, and by means of a suitable tool there is cut in the inside of flange $b$ an annular groove $e$, forming lip or bead $d$. The flange $i$ is also cut and dressed to the proper thickness. The grooves $c$ and $e$ in the tire and the beads $a$ and $f$ on the body are cut of corresponding shape and dimensions, so that the beads will fit neatly in the grooves and be locked therein when the parts are secured together.

When the parts of the body and tire are turned to fit neatly together, the tire is laid upon its outer face, and the body, with its outer face downward, is dropped into place in the tire and forced inward till its beads $a$ and $f$ are snugly seated in grooves $c$ and $e$. Flange $b$ abuts against the body, and lip $d$ of the tire fits in groove $g$ of the body. Small holes $h\,h$ are now bored in the joint between the body and tire adjacent to flange $i$, and into these holes are fitted short dowel-pins $n$, which are only long enough for their outer ends to be flush with the face of the body. These pins thus inserted serve to prevent the body and tire from turning one upon the other. The parts can now be secured together, and this is accomplished by first heating flange $i$ by a series of Bunsen or blow-pipe flames to a welding heat, as illustrated in Fig. 5, and then turning it inward and hammering it down closely upon the body. After being well hammered down it may be turned in a lathe for giving it a smoother finish.

The heating device consists of a vertical gas-supply pipe L, a circular chamber M, and a series of radial burner-pipes $m$, extending outward nearly to flange $i$. Pipe L may connect by a turning joint with a horizontal gas-pipe, and chamber $m$ may be provided centrally on its bottom with a pivotal pin resting in a socket formed in a disk of glass or other suitable material inserted in the axle-opening of the hub, so that the pipe and burners may be readily turned for evenly distributing the flame upon the flange.

The burner-pipes may be bent forward, so as to discharge the flame tangentially upon the flange, and thereby slowly turn the burners and their supply-pipe.

The interlocking beads and flanges hold the tire and body in close contact at every point in the circumference adjacent to both the outer and inner faces, so that the tire cannot expand away from the body, and the abutting flanges $b$ and turned-down flange $i$ securely fasten them together, so that they cannot work apart.

Since no bolt-holes are used, the parts are left stronger and more durable, and by dispensing with bolts and rivets the construction is much simplified and the cost reduced.

There are no parts about my wheel to wear, shake loose, and rattle. It is every way compact and neat in appearance, and is very durable and satisfactory in use.

Having thus described my invention, what I claim, and desire to secure by Letters Patent, is—

1. The method of securing together the body and tire of a car-wheel, which consists in placing the body within the tire and forcing it against a flange or ledge projecting inward from the inner periphery at or near one face, heating a flange on the other face of the tire to the working temperature, and, after the body is in position, turning such flange inward and hammering it down upon the body, whereby the parts are held securely together without the use of bolts, nuts, or rivets.

2. The method of constructing car-wheels, which consists in forming grooves and interlocking beads or flanges upon the outer periphery of the body and inner periphery of the tire, and a flange projecting from the face of the tire, then placing the body within the tire and interlocking their beads or flanges, and then heating the flange projecting from the face of the tire and hammering it down upon the body for securing them together.

In testimony whereof I affix my signature in presence of two witnesses.

JAMES RIGBY.

Witnesses:
E. B. CLARK,
SCHUYLER DURYEE.